United States Patent [19]
Clark et al.

[11] 3,876,864
[45] Apr. 8, 1975

[54] TELLER-ASSISTED CURRENCY DISPENSER SYSTEM

[75] Inventors: Robert W. Clark, Canton; Philip C. Dolsen; Donald E. Kinker, both of North Canton, all of Ohio

[73] Assignee: Diebold Incorporated, Canton, Ohio

[22] Filed: Dec. 11, 1973

[21] Appl. No.: 423,691

[52] U.S. Cl. .................... 235/61.7 B; 340/149 A
[51] Int. Cl. ........................................ G06k 17/00
[58] Field of Search ..... 235/61.7 B, 61.7 R, 61.6 R; 340/149 A, 149 R, 324 A

[56] References Cited
UNITED STATES PATENTS

| | | | |
|---|---|---|---|
| 3,662,343 | 5/1972 | Goldstein et al. | 235/61.7 B |
| 3,705,384 | 12/1972 | Wahlberg | 340/149 A |
| 3,711,833 | 1/1973 | Starkey | 235/61.7 B |
| 3,727,186 | 4/1973 | Stephenson et al. | 340/149 A |

*Primary Examiner*—Daryl W. Cook
*Attorney, Agent, or Firm*—Frease & Bishop

[57] ABSTRACT

An automatic banking system which offers personal teller assistance to a bank customer who may be having difficulty in using an automatic banking unit at a remote customer station to carry out any one of a number of banking services offered by a complete automatic banking system, such as depositing, making payments of various types, transferring funds between accounts, or withdrawing cash. Normally, the customer uses such system by following instructions which are given on a video display component of the remote unit after the customer has presented coded card means for verification and authorization at the remote unit. The customer then makes keyboard entry at the remote unit of data necessary to perform the desired banking transaction. A customer who may not understand or properly follow the instructions may request assistance of a teller-assist operator at a distant bank station. Through audio and video communication between the bank and customer stations, the teller-assist operator assists the customer, through step-by-step personal guidance, to follow the required procedure. That is, the teller-assist operator carries out the instructions and enters the necessary data into a bank station keyboard operatively connected in the system with the customer keyboard. The bank station teller-assist unit or console also has a video display component on which the same instructions appear that normally appear at the customer unit video display component. These instructions may appear simultaneously at the bank and customer video display components, or a video picture of the teller-assist operator carrying out the transaction for the customer, may be displayed to the customer on the video display component at the remote customer banking unit.

19 Claims, 16 Drawing Figures

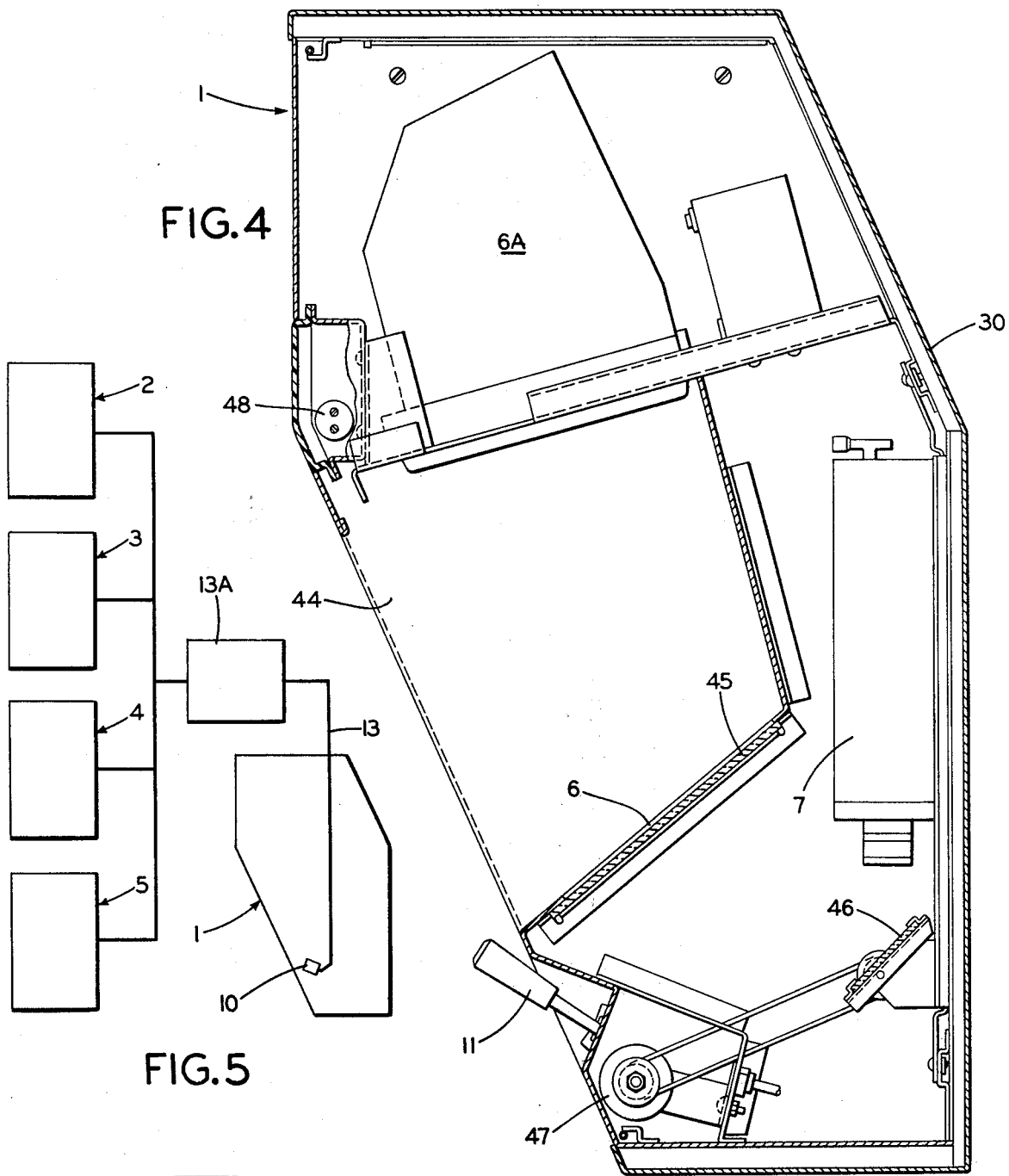
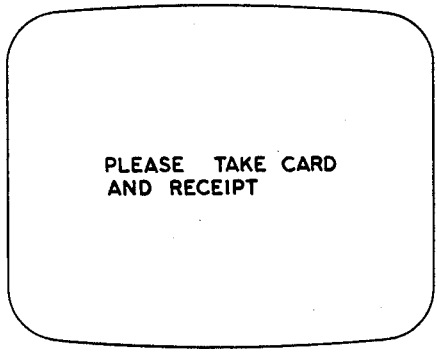
FIG. 15 — PLEASE TAKE CARD AND RECEIPT
FIG. 16 — PLEASE TAKE CASH THANK YOU

TELLER-ASSISTED CURRENCY DISPENSER SYSTEM

BACKGROUND OF THE INVENTION

1. Field of the Invention

The invention relates to total automatic banking systems which enable a diversity of banking functions to be carried out at a remote customer station unit normally intended to be used by a bank customer in accordance with instruction displayed at the customer station unit that the customer must follow for any particular banking function. Such banking functions may include accepting deposits, dispensing cash, transferring funds from one account to another, or the making payments on credit card, utility or other accounts, or on mortgage or installment loans, and the like.

The new coordinated equipment units or components permit a customer, particularly one using the automatic banking system for the first time and being hesitant in following or unable to follow required procedures stated in the displayed instructions, to be assisted by personal demonstration and step-by-step guidance of a teller-assist operator located at a bank station, to complete a selected automatic banking transaction which, as stated, the customer hesitates to attempt or may be unable to complete because of not understanding or incorrectly following the instructions displayed at the remote customer unit.

Thus, the invention relates to an integrated automatic banking system in which a personal demonstration may, if requested, be given to a bank customer to enable the customer to understand and use an automatic banking unit, unattended by bank personnel at a remote station or location, to carry out any one or more of a number of different banking transactions, by a teller-assist operator who normally may be engaged in other assignments at the teller-assist station of a bank located at a distance from the remote customer station.

2. Description of the Prior Art

There is no automatic banking system or equipment of which we are aware in the art in which a customer alone or by him or herself may be assisted or instructed in following directions (which the customer may be unable to understand or follow) for performing a banking transaction at a remote unattended banking unit, where the directions are displayed. When such customer difficulty may occur, either the customer is unable to use the remote automatic banking equipment, or bank personnel must be dipatched to the remote unit to instruct the customer, or the customer must go to the banking institution itself for special instructions in or demonstrations of the use of the equipment.

for these reasons, many banking customers who have been offered the convenience of automatic banking may have not taken advantage of it and have not become acquainted with all the benefits of automatic banking. From a practical standpoint, there has been no way prior to the invention for a bank — short of offering what might be termed a formal course of instruction at the bank for all customers — to give each customer a personal demonstration of the use and benefits of automatic banking.

There exists a need in the field of banking services and for the beneficial, efficient and easy use of unmanned customer banking service facilities remote from main banking buildings but available at all times to customers establishing authorized identity, to provide for assisting a customer at such unmanned station in carrying out a banking operation when the customer is having difficulty in so doing and requires or requests assistance, by giving such assistance by a teller-assist operator located at the main bank building, in order that the desired banking transaction can be performed or completed by or for the customer at the remote unattended customer station or unit.

SUMMARY OF THE INVENTION

Objectives of the invention include providing at a main bank location a new teller-assist unit, console or component combined or integrated with a typical remote automatic banking unit in an automatic banking system, so that a customer when requesting aid may be assisted individually and directly in carrying out a banking function or operation at the remote unit; providing a new teller-assist unit which, with slight modification, may be combined or integrated with any one of a number of known banking or currency-dispensing devices or components to permit a teller-assist operator to aid a customer in completing a banking or dispensing operation, as with equipment such as disclosed in Riddle et al. U.S. Pat. No. 3,513,298, Constable U.S. Pat. Nos. 3,641,497 and 3,657,521, Edwards et al. U.S. Pat. No. 3,697,729, and Barnes et al. U.S. Pat. No. 3,761,682; providing an automatic banking system of a type having a remote automatic banking unit equipped with a video display component where information concerning and directions for carrying out a banking function are displayed, with a new teller-assist unit combined or integrated with the remote unit also having a video display component operatively connected with the remote unit video display component; providing an automatic banking system of a type having an automatic remote banking unit equipped with a manually-operated data entry keyboard, with a new teller-assist unit combined or integrated with the remote unit also having a manually-operated data entry keyboard operatively connected with the remote unit keyboard; providing an automatic banking system having video display and manual entry keyboard components in integrated remote and teller-assist units, with video camera means in the teller-assist unit adapted to be beamed at a teller-assist operator, and with means operatively connecting the video camera means with the remote unit video display component so that the teller-assist operator may be seen by a customer while assisting the customer in completing a banking operation; providing an automatic banking system having integrated remote and teller-assist units of the character described with audio means communicating between the remote and teller-assist units; providing an automatic banking system having integrated remote and teller-assist units of the character described with signal means at the teller-assist unit and with signal-actuating means at the remote unit, so that a customer at the remote unit can actuate the signal means to request teller assitance; providing an automatic banking system having integrated remote and teller-assist units of the character described which may be actuated by coded card means at the remote unit to perform a banking function after verification of the coded card means and authorization of the banking function upon entry of coded card means by a customer into the remote unit; and providing new automatic banking system equipment which achieves the stated objectives in a safe, effective, efficient and easily-maintained manner, and which solves problems, and satisfies needs existing in the field of automatic banking.

These and other objects and advantages may be obtained by the new automatic banking system, equipment and operations, the general nature of which may be stated as including in an automatic banking system of a type in which a coded card actuated remote customer banking unit includes a manual entry keyboard, a video display component, and facilities for performing at least one of the following banking operations: depositing, dispensing cash, transferring funds from the one account to another, and making payments of various kinds; the combination of a teller-assist unit having a manual entry keyboard and a video display component operatively connected with the respective remote unit keyboard and display component; video camera means at the teller-assist unit operatively connected with the remote video display component; audio means communicating between the remote and teller-assist units; signal means connected between the remote and teller-assist units including signal actuating means at the remote unit for signaling to the teller-assist unit a request for assistance; and means selectively operable at the teller-assist unit to simultaneously display the same information at the remote and teller-assist video display components, or to display at the teller-assist video display component the message normally displayed at the remote unit video display component while displaying a picture of the teller-assist operator at the remote unit video display component; whereby the teller-assist operator may actuate selected facilities for performing banking operations at the remote unit in accordance with the information received from a customer at the remote unit through said audio means by making keyboard entries in the teller-assist unit keyboard as directed by instructions visible at the teller-assist unit video display component.

BRIEF DESCRIPTION OF THE DRAWINGS

A preferred embodiment of the invention — illustrative of the best mode in which applicants have contemplated applying the principles — is set forth in the following description and shown in the drawings and is particularly and distinctly pointed out and set forth in the appended claims.

FIG. 4 is a somewhat diagrammatic vertical sectional view of the teller-assist unit, looking generally in the direction of the arrows, 4—4, FIG. 3;

FIG. 5 is a block diagram somewhat more diagrammatic than FIG. 1, illustrating the manner in which the teller-assist unit of FIG. 3 may serve four remote automatic banking units of FIG. 2;

FIGS. 9 to 16 illustrate a series of typical messages that may be displayed at the video display of the remote unit of FIG. 2, and also at the teller-assist unit of FIG. 1 when a teller-assist operator is rendering assistance to a customer.

Similar numerals refer to similar parts throughout the various figures of the drawings.

DESCRIPTION OF THE PREFERRED EMBODIMENT

In General

Figure 1:
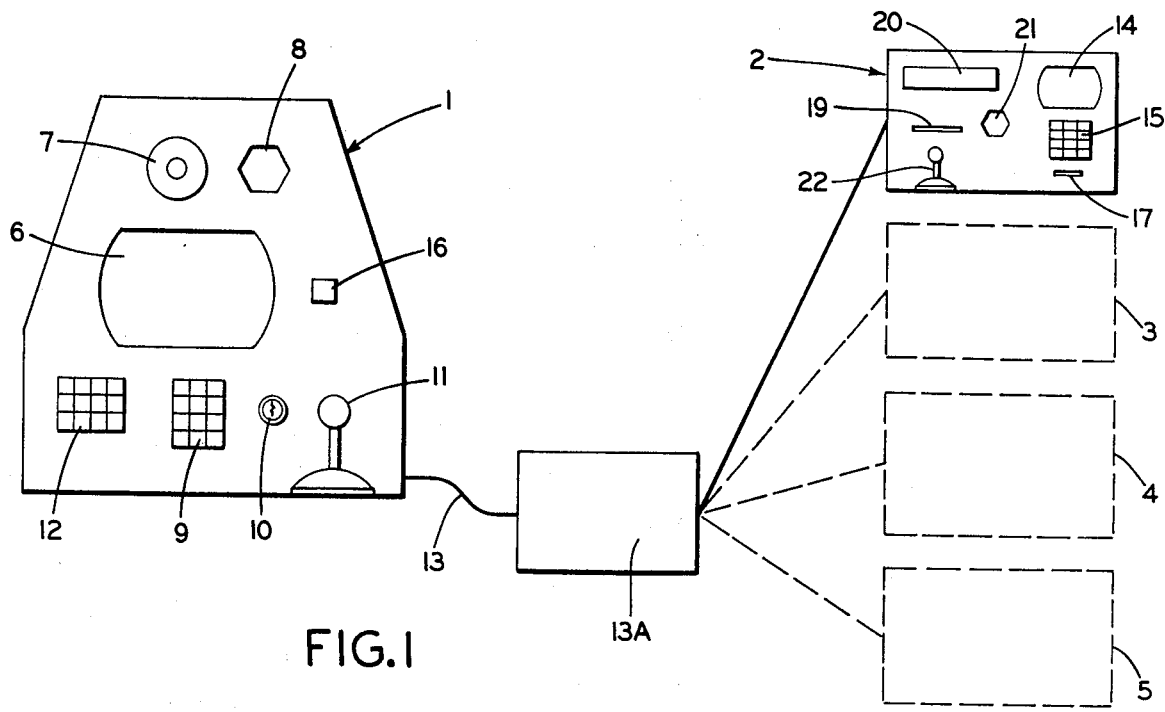
FIG. 1 is a block diagram illustrating generally the correlated or integrated relationship between one or more remote customer banking units and a teller-assist unit.

The improved teller-assist unit generally indicated at 1 provides a means for offering personal teller-assistance to bank customers using a remote automatic banking unit 2. In FIG. 1, three additional remote banking units 3, 4 and 5 are indicated diagrammatically in dotted lines, since a number of remote banking units may be served by one teller-assist unit 1.

to request assistance, a customer operates an appropriate control, described below, at one of the remote units 2, 3, 4 or 5. The teller-assist unit 1 and correlated remote units 2, 3, 4 or 5 provide for training and assisting bank customers in the use of an automated banking unit 2, without the need of having bank personnel present at all times or at any time at any such remote unit 2.

Major components of the teller-assist unit 1 are shown diagrammatically in FIG. 1 including a video display 6, a video camera 7, an audio speaker 8, a keyboard 9, a teller-assist on-off key switch 10, a microphone 11 and audio-video switch means 12. The teller-assist unit 1, as indicated, may serve a plurality of remote units, such as four separately-located units 2, 3, 4 and 5, through interconnection by cable means 13 and controller means 13A of unit 1 and remote units 2, 3, 4 and 5. The controller means 13A is located at the teller-assist station and may be a part of unit 1 or may be separately housed. Its function is to interconnect the assist unit 1 with the various remote units 2, 3, 4 and 5 served by unit 1.

After a bank customer inserts his bank card, preferably a coded card, into a remote unit 2, as described below, and after the card is checked by unit 2 and found to be valid, a message is displayed on a video display 14 at the remote unit 2, asking the customer whether the customer would like assistance in operating the unit 2. If the customer actuates the "NO" switch or button on the keyboard 15 of unit 2, no assistance is offered, and the customer operates the remote unit 2 by himself.

However, if the customer desires assistance, he may actuate the "YES" switch, key or button on the keyboard 15 of unit 2. This in turn actuates an audio-visual signal at the teller-assist unit 1. The signal may be either a buzzer or bell and a light 16. There may be an individual signal light as a part of signal means 16 (as described below) at the teller-assist station 1 for each remote unit 2, 3, 4 or 5 served by the unit 1. Teller-assist switch means 10, as shown, when turned on at the unit 1 connects the unit 1 through the system 13–13A with the remote units 2, 3, 4 and 5 (FIG. 5). The switch means 12 has components described below, to energize audio-video communication with the remote unit 2, 3, 4 or 5 which has requested assistance; and the teller-assist operator, who is alerted by the signal, actuates a component of switch means 12 to establish such two-way audio communication with the appropriate remote unit 2, 3, 4 or 5; and also to connect the teller-assist unit video display 6 with the similar video display 14 at the remote unit.

At the time that the customer has requested assistance, the customer's coded card is being scanned at the unit 2, and his name is displayed at the remote unit video display component 14. A similar display of the customer's name also occurs at the video display 6 at the teller-assist unit 1 so that the teller-assist operator may address the customer by name through the audio communication.

The operator may then inquire of the customer how he may be of assistance, addressing the customer by name, as stated. The teller-assist operator also at any time during this conversation, may activate a switch component of the audio-video switch means 12 so that a picture of the operator taken by the video camera 7 appears at the video display 14 in order that the customer will see the teller-assist operator throughout the customer-assist procedure. During this conversation, the type of assistance desired by the customer is determined, and the teller-assist operator can provide assistance in one of two manners or by a combination of both.

First, the teller-assist operator may complete the required transaction by using the keyboard 9 which is connected directly to and as a duplicate of the keyboard 15 of the unit 2. Meanwhile, the operator sees the procedural display while the customer sees the teller-assist operator, and in conversation with the customer, the operator keys in the desired transaction data. The customer thus only is required at the proper time to drop an envelope into the depository if the transaction is a deposit operation, or to take money if a currency-dispensing operation from the delivery door, and to receive his coded card and an acknowledgment of the transaction.

Second, and alternately, the teller-assist operator can monitor the customer's operation of the remote unit 2. To do this, the teller-assist operator actuates a component of switch means 12 so that procedural instructions in sequence are displayed simultaneously at the units 1 and 2. The customer operates the keyboard 15 while conversing with the operator for any assistance, clarification or additional instructions needed for carrying out the operating procedure for the unit 2. This is the preferred mode of use of the integrated equipment, since the customer is trained thereby in machine operation and should not soon require assistance in the future.

Upon completion of the customer-assist operation, the operator actuates the controls of the assist unit 1 to place the unit 1 back into a condition of "Wait" or standby mode of operation.

The unit 1 may be turned off and on by means of the key switch 10. Turning the key switch 10 to the "OFF" position, removes power to the unit 1 and signals the unit 2 and other connected units that there should no longer be a display of a message that teller-assistance is available.

Alternatively, actuating the key switch 10 to "ON" position, energizes the assist unit 1 to an operable condition and signals the unit 2 and other connected units that a teller-assistance message should be displayed in the sequence of operation instructions displayed at the various video display components 14 of the remote units 2, 3, 4 and 5.

Remote Customer Station Automatic Banking Unit

Figure 2:
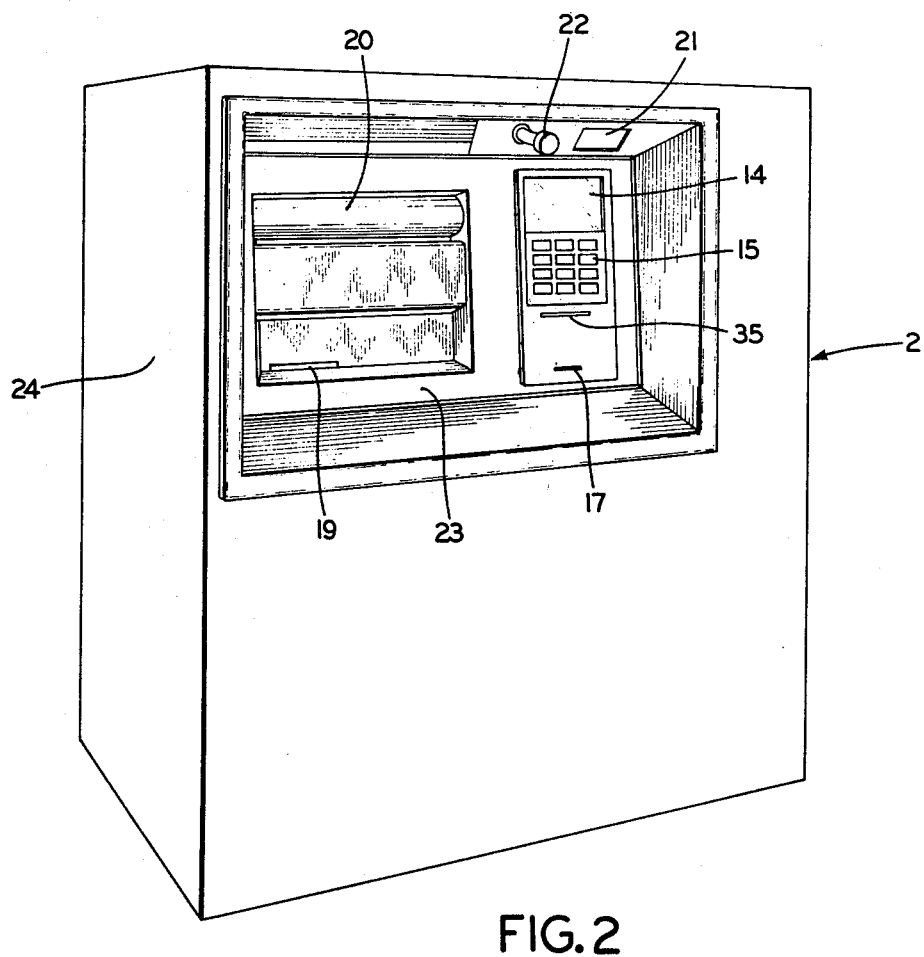
FIG. 2 is a diagrammatic perspective view of one of the remote units.

One of the remote units 2, 3, 4 or 5, is indicated generally at 2 in FIG. 2, and any such unit is a vault-like structure located at any desired unattended location convenient for offering automatic banking services at all times to authorized bank customers.

The remote unit 2 may be of the general type of automatic currency dispensers shown in any of U.S. Pat. Nos. 3,641,497, 3,657,521, 3,697,729 and 3,761,682, having an entry slot 17 for the insertion of a personalized, preferably conventional magnetic plastic coded card 18 (FIGS. 7 and 8) for initiating an automatic banking transaction, a keyboard 15 for the entry of data to carry out the desired banking transaction, and a display panel 14 where instructions are displayed to direct the customer in carrying out a selected banking operation. The unit 2 also may have a deposit slot 19 for accepting a banking transaction deposit, and a door or drawer 20 for delivering cash when a cash dispensing operation is carried out.

The unit 2 also is equipped with an audio speaker 21 and an audio microphone 22. The described components of the unit 2 preferably are accessible to a customer at a recessed panel 23 in the housing 24 of the unit 2. Since the unit 2 contains a supply of cash from which currency is dispensed, and also may contain a depository receptacle into which deposits entered through slot 19 are discharged, the housing 24 has protective walls to form the vault-like structure described. All of the electronic and control equipment components for the automatic operation of the unit 2 also are contained in the housing 24.

As stated, the unit 2 may be of the general type of currency dispenser shown in the prior patents enumerated, so that items may be dispensed to a customer in response to the introduction of a valid security and additional predetermined information into the unit. The security card may be a coded card 18 of a known type such as an embossed credit card containing one or more magnetic tracks or stripes wherein various data is encoded. A personal identification number of the customer is entered in the keyboard, and the unit has means for reading data from the card, which, along with the personal identification number introduced, and other protective information which may be introduced, are checked through electronic logic to determine the validity of the card and the validity of the information.

The unit 2 is modified from the indicated prior types of equipment to the extent of providing a video display 14 of messages, instructions, etc., for directing the customer as to the steps to be taken to carry out a particular selected transaction, rather than back lighted signs used in some prior devices.

The various messages to be displayed may be stored in a computer also contained in the housing 24. Such messages through a character generator included in the video controller are displayed at video display 14 in a series determined in accordance with the programming of any particular banking transaction to be carried out. The computer is programmed to supply input to the character generator of the controller of the series of messages to be displayed at the video display 14. The controller and its character generator in unit 2 may function or operate in a manner such as set forth, for example, in U.S. Pat. No. 3,772,676. The video controller may, for example, comprise a Model 204RO Video Terminal Controller, sold by Ann Arbor Terminals, Incorporated, of Ann Arbor, Michigan.

Figure 9:
Figure 10:
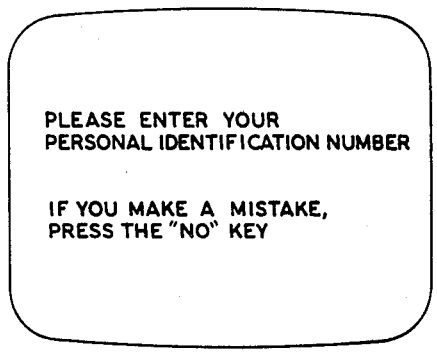

A typical video message displayed at video display 14 is shown in FIG. 9. When the customer inserts his coded card 18 in slot 17, the next message displayed may be that shown in FIG. 10. When the check is made in the unit 2 computer as to the validity of the card 18 and the validity of the related personal identification number which the customer has interest as directed by the instruction of FIG. 10, the next message that may be displayed is shown in FIG. 11.

Figure 11:
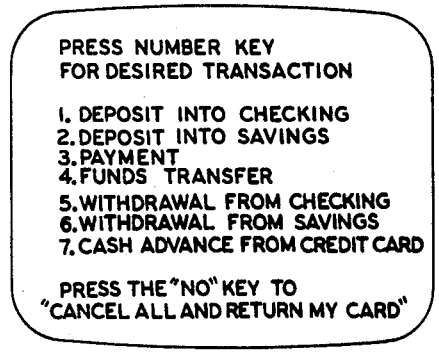

In accordance with the invention, in order to provide for teller-assistance, when the teller-assist unit 1 is integrated with the unit 2 after actuating key switch 10 to "ON" position, the message of FIG. 11 is modified to that of FIG. 12, indicating that the teller assistance is available.

Figure 13:
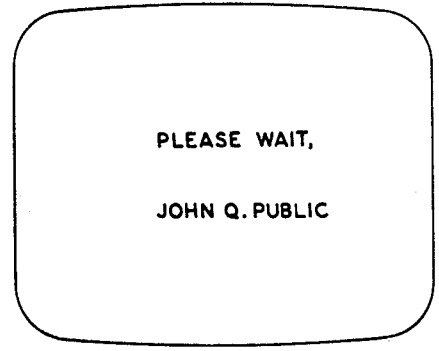

The customer, if desiring teller assistance, will press the "YES" button at keyboard 15, whereupon the message of FIG. 13 appears at video display 14 which includes the customer's name that is read in the unit 2 from the customer's coded card 18, which has been inserted in the entry slot 17.

The construction and components of the teller-assist unit 1 are described below under the heading, "Teller-Assist Unit," as well as the integrated control and switching equipment connecting a teller-assist unit 1 with one or more units 2. The integrated operation of the units then is described in explaining the manner in which a teller-assist operator assists a customer in carrying out a banking transaction.

Teller-Assist Unit

The teller-assist unit 1 (FIGS. 3 and 4) preferably comprises a housing 30 having a front opening 44. A TV monitor 6A (FIG. 4) is mounted in the upper portion of the housing 30, and the picture displayed thereon may be reflected from a reflective coating on the upper surface of a glass plate 45 to present a video display 6 at the unit 1.

A mirror 46 is adjustably mounted in housing 30 below glass plate 45 at which TV camera 7 is directed. Camera 7 takes a picture by reflection from mirror 46 and through glass plate 45 of the teller-assist operator 49. The angle of mirror 46 may be adjusted by adjusting means 47 to accommodate the height of the operator. A fluoroescent ligth fixture 48 is mounted in the upper part of the housing 30 to provide sufficient lighting of the face of the operator 49, so that a distinct picture of the operator may be taken by TV camera 7.

The keyboard 9 at the teller-assist unit 1 (FIG. 3) also may be contained in the housing 30, if desired. However, it may be more convenient to have a separate keyboard unit 9, as illustrated in FIG. 3, which may be moved to locations for convenient operation by the teller-assist operator 49.

The keyboard 9 has the same number of keys as the keyboard 15 of the remote unit 2; and the respective keys of the keyboards 9 and 15 are integrated so that any key on either keyboard performs the same function as the same key on the other keyboard.

Figure 3:
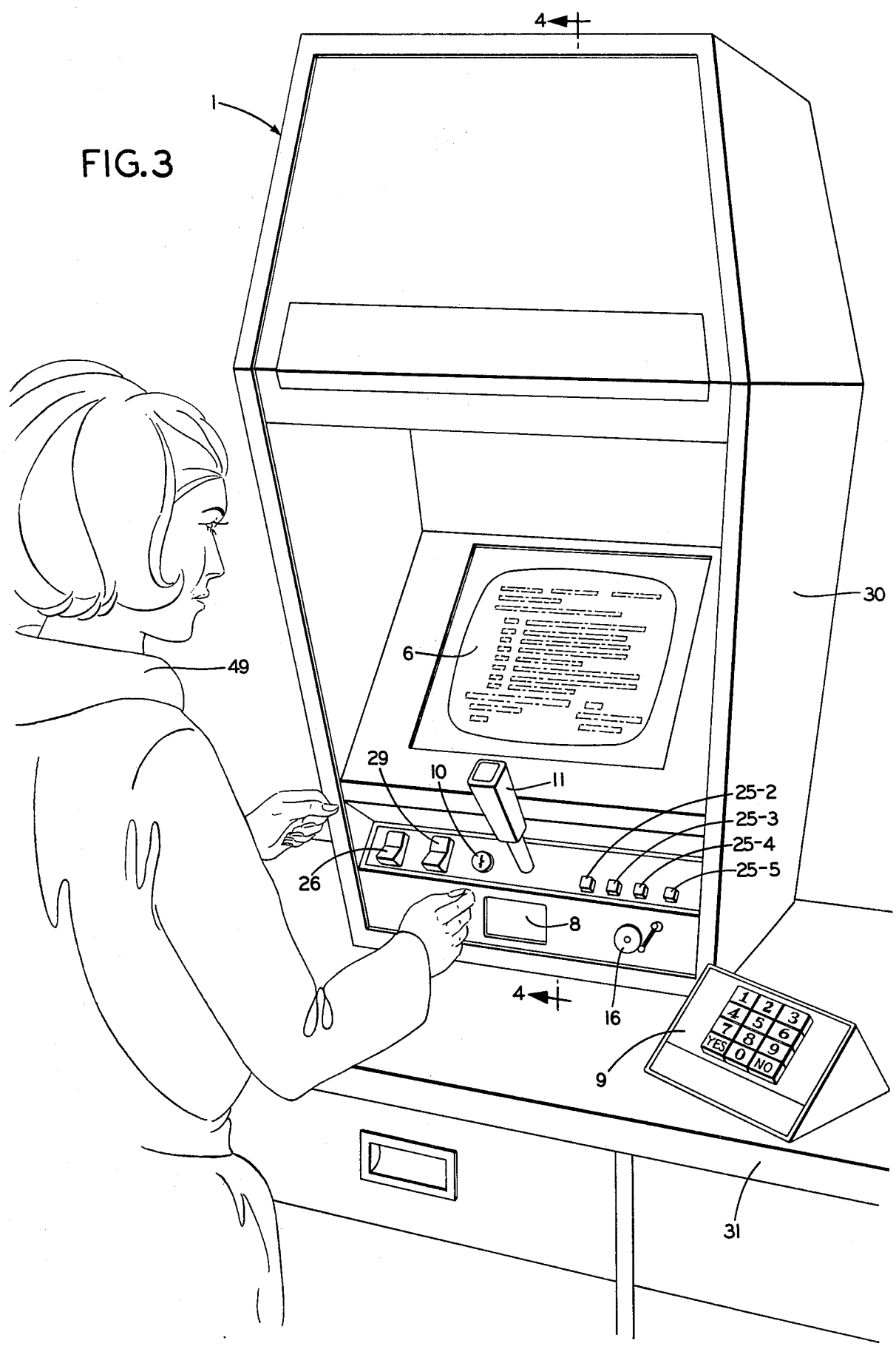
FIG. 3 is a somewhat diagrammatic view of a teller-assist unit located at a banking building conveniently accessible to a teller-assist operator in the bank.

The teller-assist unit 1 with its video display 6, camera 7, speaker 8, keyboard 9 and microphone 11, as shown in FIGS. 3 and 4, is illustrated in FIG. 1 as having switch means 12. This switch means 12, shown diagrammatically in FIG. 1, may include a series of lighted switches 25-2, 25-3, 25-4 and 25-5 (FIG. 3) connected respectively with the remote units 2, 3, 4 and 5. Any of lighted switches 25-2, 25-3, 25-4 and 25-5 of FIG. 3 actuates a switch identified at 25 in FIG. 6 and located at unit 1. Switch 25 is indicated as being an audio switch, although when closed upon actuation, it energizes both the audio and the video systems for the particular remote unit 2 which is operatively connected with the teller-assist unit 1, as described below.

When assistance is requested from remote unit 2 by a customer who has pressed the "YES" button of keyboard 15 in accordance with directions given to the customer at video display 14, switch 25-2 lights, and the signal 16 sounds to attract attention of a teller-assists operator near to unit 1. At this time, the lighted switch 25-2 is seen by the operator, who then actuates switch 25-2 connecting the teller-assist unit 1 with the remote unit 2 which has signaled.

Previously, in order that the unit 1 is supplied with power, a power ON-OFF switch 26 has been actuated to "ON" position at the unit 1. This energizes the switcher mechanism 27, illustrated in FIG. 6; and switch 26 may be one of the switches of switch means diagrammatically indicated at 12 in FIG. 1.

Previously, also, as described above, the teller-assist key switch 10 (FIGS. 1, 3 and 5) has been turned to "ON" position whenever a teller-assist unit, and to instruct all remote units connected to the teller-assist unit 1 that teller assistance is available. This is diagrammatically shown in FIG. 5 where the teller-assist unit 1 is indicated as having operative connection with remote units 2, 3, 4 and 5 through cable 13 and control means 13A.

When the power ON-OFF switch 26 is in "ON" position, it energizes the video camera 7, and the video display 6, as well as other components of the switcher mechanism 27.

Figure 6:
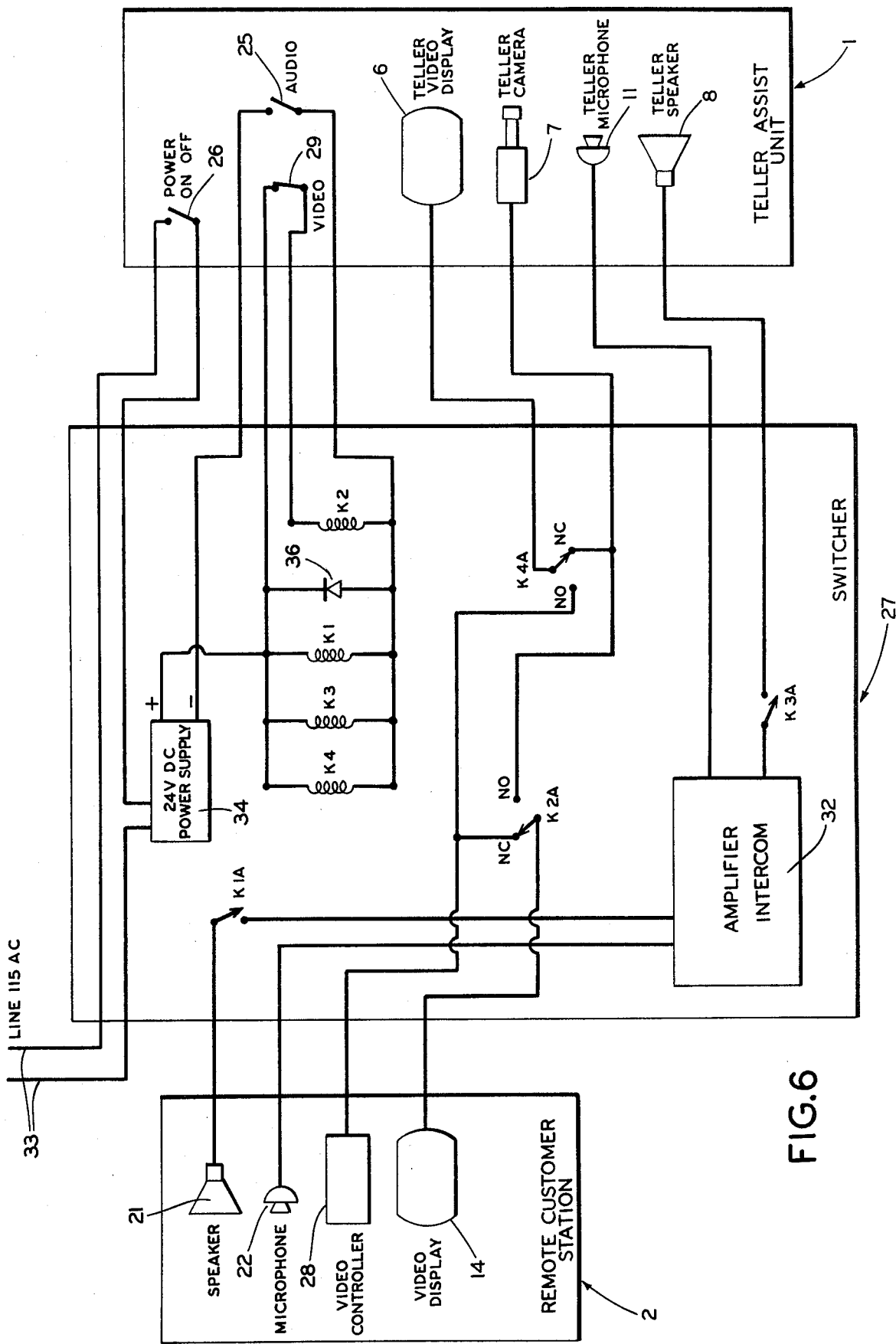
FIG. 6 is a wiring diagram illustrating a switcher unit operatively connected between a teller-assist unit and one remote banking unit.

The switcher mechanism and its components are indicated generally within the large block 27 of FIG. 6, which also illustrates in block 1 the teller-assist unit 1 and some of its components, and in block 2 the remote customer station unit 2 and some of its components. The switcher mechanism 27 may be contained in the teller-assist unit 1 within the housing 30 (FIG. 3) of teller-assist unit 1 or, if desired, it may be located separately below the counter 31 at the teller-assist operator station, illustrated in FIG. 3.

Four relays, K1, K2, K3 and K4, are contained in switcher 27. Relay K1, when energized, closes its switch K1A to connect the speaker 21 in remote unit 2 through an amplifier in intercom 32 to microphone 11 at the teller-assist unit 1.

Relay K2, when energized, actuates its switch K2A from the normally closed position shown to the normally open position contact thereby connecting the teller-assist camers 7 with the video display 14 at the remote unit 2. When switch K2A is in the normally closed position shown, the video controller 28 at remote unit 2 is connected with the video display 14 at the remote unit 2.

Relay K3, when energized, actuates switch K3A to close a circuit from the teller-assist speaker 8 through the amplifier in intercom 32 to the remote unit microphone 22.

Relay K4, when energized, actuates switch K4A, from the normally closed position shown, to the normally open contact to connect the teller video display 6 with the video controller 28 at the remote unit 2 so that the messages programmed normally to be displayed to the customer at the video display 14 are displayed to the operator of the teller-assist unit 1 at video display 6.

When the switch K4A is in normally closed position, the teller-assist camera 7, which is directed toward the teller-assist operator, displays a picture of the operator at the teller-assist video display 6, so that the operator sees his or her own picture.

When power ON-OFF switch 26 is actuated to closed position, power from Ac line 33 energizes DC power supply 34. Thus, when switch 25 is closed by actuation of switch 25-2 (FIG. 3) by a teller-assist operator following a request for assistance, a circuit is established which energizes all four relays K1, K2, K3 and K4. This results in establishing audio communication, by the closing of switches K1A and K3A, between the teller-assist unit 1 and the remote unit 2; in actuating switch K2A to the normally open contact establishing a line which permits the teller's picture from camera 7 to be displayed at the remote unit video display 14; and in actuating switch K4A to the normally open contact so that the messages programmed to be displayed normally to the customer at the remote unit 2 from video controller 28 are displayed to the teller-assist operator at video display 6.

Thus, the teller-assist operator then may question the customer as the nature of assistance desired and may carry out a banking operation by following the directions displayed at video display 6 in accordance with information obtained from the customer through audio communication.

The initial questioning of the customer as to the type of assistance desired, can take place after the message "PLEASE WAIT" is displayed as shown in FIG. 13. The customer meanwhile may be addressed by name, since his name, seen by the reader in unit 2 from the coded card 18 inserted in the entry slot 17 is displayed as a part of the instructional display sequence in the message of FIG. 13. While it is desirable to display the customer's name at the teller-assist unit 1, operation of the system does not require such display; and the display of the customer's name at video display 6 may be omitted.

The message of FIG. 13 will be displayed after the customer has asked for teller-assistance and beofore the picture of the operator comes on to the video display 14. After the operator 49 (FIG. 3) has closed the switch 25, the operator presses the "YES" key at keyboard 9 which shifts the message displayed at video display 6 back to that shown in FIG. 12. Through questioning, the customer may indicate the desired transaction, such as a withdrawal from his checking account of, say, $50.00.

Figure 14:
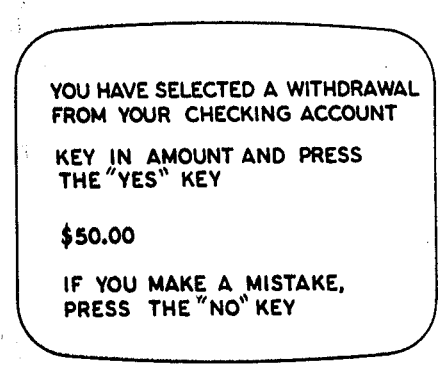

To accomplish this, the teller will press key 5 at the teller kekyboard 9 whereupon the message shown in FIG. 14 is displayed at video display 6 and operator 49 then keys into keyboard 9 the amount of $50.00.

After the amount of money to be withdrawn has been keyed into keyboard 9, the operator 49 presses the "YES" key in keyboard 9, as directed in the message of FIG. 14. The next message displayed, not shown, may be a statement, "YOU HAVE KEYED IN AN AMOUNT OF $50.00. IF CORRECT, PRESS 'YES' KEY. IF INCORRECT, PRESS 'NO' KEY." Assuming that the amount has been correctly keyed, the operator then again will press the "YES" key of keyboard 9, whereupon the message of FIG. 15 is displayed at video display 6.

The operator then tells the customer to take his card 18 which, at the time, is returned through entry slot 17 and to take a receipt for the transaction which issues through slot 35 at the remote unit 2.

When the customer has received his card 18 and such receipt, the next message of FIG. 16 is displayed to the operator at video display 6; and the operaaor tells the customer to take cash at the door or drawer 20 at the remote unit 2. In this manner, the customer's cash withdrawal transaction has been completed.

Where alternative use of teller assistance to supervise the customer in carrying out the banking operation is adopted, the operator, after discussion with the customer, actuates video switch 29 to open it. This de-energizes relay K2, and switch K2A moves to the normally closed position connecting video display 14 at the remote unit with the video controller 28 and also connecting video display 6 at the teller-assist unit 1 with the video controller 28 through the normally open position of switch K4A.

This permits messages for the particular banking transaction being carried out to be displayed at both video displays 14 and 6. Although camera 7 is energized, its signal goes nowhere because the switch K4A has been moved from the normally closed contact.

in the alternative procedure, the customer carries out the various operations while the operator explains what should be done at each step, in accordance with the instruction displayed at both video displays 6 and 14.

The suppressor diode 36 is connected in the lines which energize the relays to protect the television camera and video display units.

Any of the banking transactions listed as items 1 to 7 in FIGS. 11 or 12, may be carried out in the manner described above for a cash withdrawal from a checking account. The directions or instructions for any transaction are displayed in a manner similar to that described in connection with FIGS. 12 to 16.

Coded Card

Figure 7:
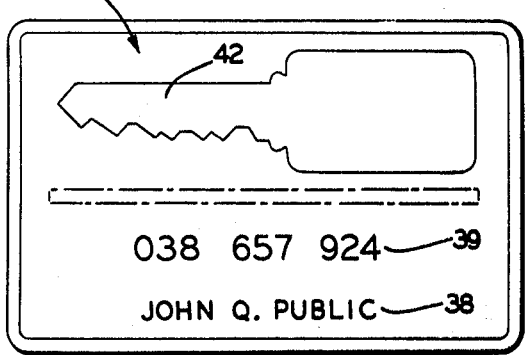
FIG. 7 is a diagrammatic view of the front of a typical coded credit card which may be used to actuate a banking unit, such as illustrated in FIG. 2.
Figure 8:
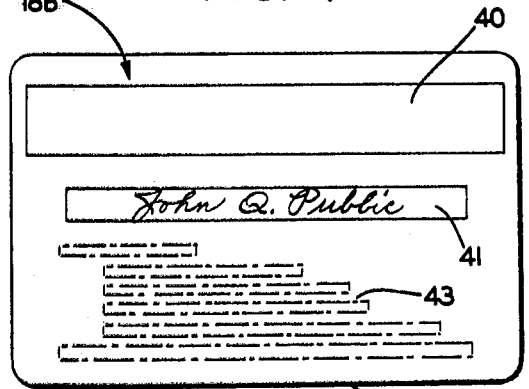
FIG. 8 is a view of the back of the coded card shown in FIG. 7.

As stated, the remote unit may be of a known general type of automatic currency dispenser which is actuated on insertion of a coded card 18. A typical coded card 18 is shown in FIGS. 7 and 8 and may be any usual or conventional type of personalized plastic credit card, for example, having the customer's name 38 and account number 39 embossed on the top side 18A. Such coded cards frequently are used for a variety of purposes and may have data magnetically encoded thereon in one or more stripes or lines at the location of the rectangular area 40 at the top of the backside 18B of the coded card 18. Another area 41 sometimes is provided where the customer's signature appears, but this is not necessary for carrying out the teller-assist procedure.

The front side 18A of the card 18 also may contain an indicator such as the key 42 to instruct the customer of the direction in which the card 18 should be entered into the slot 17 of the remote unit 2. Other directions may appear at 43, if desired, on the back side 18B of the card 18.

Although it has been indicated that the coded card 18 may be a usual or conventional type of personalized plastic credit card adapted for use in any of the known types of currency dispensers, it is preferred that the card 18 should be a magnetically-encoded Automatic Banking System (ABS) card. Such a card may provide three or more magnetic stripes, including a first stripe for air line reservation information, and which also can include the name of the card owner. The magnetic stripes also may include a second stripe for encoding information called for by the American Bankers Association (ABA). The magnetic stripes also may include a third stripe where special information may be encoded relating to the operation of Automatic Banking System currency dispensers, etc., specifications for which have been prepared by Mutual Institutions National Transfer Systems, Inc. (MINTS) with regard to security requirements for unattended teller systems.

The Teller-Assist System

The various components of the new teller-assist system have been described in detail, as well as their integrated and related operation so that an Automatic Banking System (ABS), using any one of a number of types of known currency dispensers, with modification to include video display of instructions for carrying out a selected banking transaction, may be provided with assistance for the customer in carrying out the desired transaction in the event that the customer encounters difficulties at a remote until unattended by bank personnel.

In describing the various components and their operation, a video controller 28 has been referred to as being located at the remote unit (FIG. 6). This controller 28 is the component previously described as being one which may function as set forth in U.S. Pat. No. 3,772,676 or may be an Ann Arbor Terminals, Incorporated, video terminal controller — Model 204RO.

Also, as indicated, the remote unit may be one actuated by a coded card that conforms to security requirements for unattended teller systems.

Finally, the operation of the remote unit 2 preferably involves confirmation or verification of the entries that are made with respect to the steps of the transaction to be taken, step-by-step, with a "YES" or a "NO" answer.

Accordingly, the concept of the invention provides a new system by which a customer using an automatic banking unit at a remote location may be rendered assistance in completing a banking transaction in accordance with instructions displayed to the customer, if the customer asks for assistance.

In this manner, the improved system achieves the objectives stated, eliminates difficulties that have been encountered, particularly hesitance of a customer to realize fully the advantages of automatic banking, which difficulties have existed in the art, and solves problems and obtains the new results described.

The remote customer station automatic banking unit described herein is further described and claimed in the copending application Ser. No. 502,898, filed Sept. 3, 1974, of Donald E. Kinker and Herbert Morello, for Automatic Banking Equipment.

The drawer construction for delivering cash when a cash dispensing operation is carried out, referred to herein, is described and claimed in the copending application Ser. No. 445,236, filed Feb. 25, 1974, of Herbert Morello, George S. Mountford and Richard E. Keck, for Rotary Cash Drawer Mechanism for Currency Dispensers.

The entry slot for the insertion of a coded actuating card, referred to herein, is described and claimed in the copending application Ser. No. 495,581, filed Aug. 8, 1974, of Herbert Morello and George S. Mountford, for Entry Gate Construction For Credit Card Actuated Automatic Remote Banking Equipment.

The depository construction for a remote automatic banking unit, referred to herein, is described and claimed in the copending application Ser. No. 477,769, filed June 10, 1974, of Leo J. Grosswiller, Jr. and Paul A. Leipelt, for Rotary Depository Construction.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the teller-assisted currency dispenser system and the related teller-assist equipment are assembled, combined, integrated and operated, and the advantageous, new and useful results obtained; the new and useful structures, devices, components, elements, arrangements, parts, combinations, systems, equipment, operations and relationships are set forth in the appended claims.

We claim:

1. In an integrated automatic banking system, the combination of a remote currency dispensing unit adapted to be actuated by customer insertion of a coded-card, and a separate teller-assist unit adapted to be served by a teller-assist operator; the remote and teller-assist units each having data entry keyboard and video display components respectively operatively connected with each other; means for assistance-request-signaling from the remote to the teller-assist unit; a video camera at the teller-assist unit operatively connected with the remote video display component; audio communication means connecting the remote and teller-assist units; means operative at the teller-assist unit to connect with the remote keyboard, the teller-assist keyboard, to supply data entered in the teller-assist keyboard to the remote unit; said last-mentioned means also being operative to display component, at the teller-assist video display component; and means operative at the teller-assist unit selectively display at the remote video display component either the normally displayed use-directions, or the output of the video camera.

2. In an automatic banking system as set forth in claim 1, means operative at the teller-assist unit to display at the remote video display component a message that assistance is available.

3. In an automatic banking system as set forth in claim 1, means operative at the teller-assist unit to disconnect operative connection between the remote and teller-assist units.

4. In an automatic banking system as set forth in claim 1, a plurality of remote units each similarly operatively connected with the teller-assist unit; and means at the teller-assist unit selectively to operably connect the teller-assist keyboard with that one of the plurality of remote units which has requested assistance.

5. In an automatic banking system as set forth in claim 4, in which the signaling means includes lighted switch means at the teller-assist unit, one for each remote unit; and in which the lighted switch means when actuated by a teller-assist operator, operatively connects the teller-assist keyboard component with the remote unit that has requested assistance.

6. In an automatic banking system as set forth in claim 5 in which signaling means actuation of any lighted switch means energizes an audible signal at the teller-assist unit.

7. In an automatic banking system as set forth in claim 1 in which the remote currency dispensing unit is equipped to carry out in addition to currency dispensing, at least one of the following banking transactions: depositing, making payments of various types, and transferring funds between accounts.

8. In an automatic banking system as set forth in claim 1, in which the coded card contains customer name indicia; in which the remote unit reads from the coded card the customer's name and displays the name normally at the remote unit video display component; and in which the customer's name also is displayed at the teller-assist unit video display component.

9. In an automatic banking system of a type in which a coded card-actuated remote customer banking unit includes a manual entry keyboard, an instruction display component, and facilities for performing at least one of the following banking operations: depositing, dispensing cash, transferring funds from one account to another, and making various kinds of payments; the combination of a video display component constituting the remote unit display component; a teller-assist unit having a manual entry keyboard and a video display component operatively connected with a respective remote unit keyboard and video display components; video camera means at the teller-assist unit operatively connected with the remote video display component; audio means communicating between the remote and teller-assist units; signal means connected between the remote and teller-assist units including signal actuating means at the remote unit for signaling to the teller-assist unit a request for assistance; and means selectively operative at the teller-assist unit to simultaneously display the same information at the remote and teller-assist video display components, or to display at the teller-assist video display component the message normally displayed at the remote unit video display component, while displaying the output of the video camera means at the remote unit video display component; whereby a teller-assist operator may enter data into the teller-assist keyboard to carry out a banking transaction at the remote unit as directed by instructions visible at the teller-assist video display component in accordance with information received from a customer at the remote unit through said audio means.

10. In an automatic banking system as set forth in claim 9, means operative at the teller-assist unit to display at the remote video display component a message that assistance is available.

11. In an automatic banking system as set forth in claim 9, means operative at the teller-assist unit to disconnect operative connection between the remote and teller-assist units.

12. In an automatic banking system as set forth in claim 9, a plurality of remote units each similarly operatively connected with the teller-assist unit; and means at the teller-assist unit selectively to operably connect the teller-assist keyboard with that one of the plurality of remote units which has requested assistance.

13. In an automatic banking system as set forth in claim 9, in which the coded card contains customer name indicia; a construction in which the remote unit reads from the coded card the customer's name and displays the name normally at the remote video display component, and in which the customer's name also is displayed at the teller-assist unit video display component.

14. In an automatic banking system which includes at least one coded-card-actuated remote customer banking unit of a type having keyboard data input means and display means for instructing a customer how to carry out a banking transaction; the combination of video display means constituting the remote unit display means; a teller-assist mean unit at a main bank location having keyboard data input means and video display means; the teller-assist keyboard and video display means and the remote keyboard and video display means respectively being operatively connected; video camera means at the teller-assist unit adapted to be beamed on a teller-assist operator and said camera means being operatively connected with the remote video display means; audio means communicating between the remote and teller-assist units; signal means connected between the remote and teller-assist units operative at the remote unit audibly and visually to signal at the teller-assist unit a request for assistance; and means operative at the teller-assist unit to integrate the teller-assist keyboard means operatively in the system with the remote keyboard means, and to integrate substitutionally, the teller-assist video display means operatively in the system for the remote video display means, so that a teller-assist operator may enter data in the teller-assist keyboard means to follow instructions displayed at the teller-assist video display means to carry out a banking transaction according to information supplied by a customer through the audio means.

15. In an automatic banking system as set forth in claim 14, the construction in which the means operative to integrate the teller-assist and remote keyboard and video display means, also energizes the audio means communication between the remote and teller-assist units.

16. In an automatic banking system as set forth in claim 14, means operative at the teller-assist unit to display at the remote video display means a measage that assistance is available.

17. In an automatic banking system as set forth in claim 14, means operative at the teller-assist unit to disconnect operative connection between the remote and teller-assist units.

18. In an automatic banking system as set forth in claim 14, a plurality of remote units each similarly operatively connected with the teller-assist unit; and means at the teller-assist unit selectively operable to connect the teller-assist keyboard means with that one of the plurality of remote units which has requested assistance.

19. In an automatic banking system which includes a card-actuated unattended customer banking unit located separately from a customer's bank, and in which the unattended banking unit is of a type having manual entry keyboard means and display means for instructing the customer how to carry out a banking transaction; the combination of video display means constituting the unattended unit display means; a teller-assist unit at the customer's bank having manual entry keyboard means and video display means; the teller-assist keyboard and video display means being operatively connected respectively with the unattended unit keyboard and video display means; the teller-assist unit having video camera means adapted to be beamed on a teller-assist unit operator and said camera means being operatively connected with the unattended unit video display means; audio communication means operatively connecting the unattended and teller-assist units; signal means connected between the unattended and teller-assist units operative at the unattended unit to signal a request for assistance at the teller-assist unit; and means operative at the teller-assist unit to supply teller-assist keyboard means output to the unattended unit in place of unattended unit keyboard means output, and to supply the unattended video display means input to the teller-assist video display means; whereby an operator at the teller-assist unit whose assistance has been requested may actuate the unattended unit keyboard means as instructed by instructions displayed at the teller-assist video display means to carry out a banking transaction in accordance with information supplied by the customer through the audio communication means.

* * * * *

UNITED STATES PATENT AND TRADEMARK OFFICE
CERTIFICATE OF CORRECTION

PATENT NO. : 3,876,864
DATED      : April 8, 1975
INVENTOR(S) : Robert W. Clark, Philip C. Dolsen and Donald E. Kinker It is certified that error appears in the above-identified patent and that said Letters Patent are hereby corrected as shown below:

```
Column 1, line 11, change "instruction" to -- instructions --
Column 1, line 54, change "for" to -- For --
Column 4, line 24, change "to" to -- To --
Column 6, line 40, insert -- card -- after "security"
Column 7, line 50, change "ligth" to -- light --
Column 8, line 17, change "assists" to -- assist --
Column 8, line 29, before "unit, and" insert -- operator is avail-
    able at the bank, to render assistance through the teller-
    assist --
Column 8, line 58, change "camers" to -- camera --
Column 9, line 15, change "Ac" to -- AC --
Column 9, line 32, insert -- to -- after "as"
Column 9, line 50, change "befoore" to -- before --
Column 9, line 60, change "kekyboard" to -- keyboard --
Column 10, line 13, change "operaaor" to -- operator --
Column 10, line 32, change "in" to -- In --
Column 11, line 29, change "until" to -- unit --
Column 12, line 51, after "operative to display" and before "com-
    ponent," insert -- use-directions, normally displayed at the
    remote video display --
Column 12, line 53, after "selectively" insert -- to --
Column 14, line 21, delete "mean" before "unit"
Column 14, line 52, change "measage" to -- message --
```

Signed and Sealed this

Twenty-first Day of December 1976

[SEAL]

Attest:

RUTH C. MASON
*Attesting Officer*

C. MARSHALL DANN
*Commissioner of Patents and Trademarks*